United States Patent
Watanabe et al.

(10) Patent No.: US 6,834,192 B1
(45) Date of Patent: Dec. 21, 2004

(54) METHOD, AND ASSOCIATED APPARATUS, FOR EFFECTUATING HANDOVER OF COMMUNICATIONS IN A BLUETOOTH, OR OTHER, RADIO COMMUNICATION SYSTEM

(75) Inventors: Fujio Watanabe, Espoo (FI); Phong Nguyen, Gepps Cross (AU); Takako Sanda, Kanagawa (JP)

(73) Assignee: Nokia Corporation, Espoo (FI)

( * ) Notice: Subject to any disclaimer, the term of this patent is extended or adjusted under 35 U.S.C. 154(b) by 231 days.

(21) Appl. No.: 09/609,632

(22) Filed: Jul. 3, 2000

(51) Int. Cl.[7] ............................. H04Q 7/20; H04Q 7/00
(52) U.S. Cl. ...................... 455/444; 455/437; 455/436; 455/41.2; 455/522; 370/331; 370/338
(58) Field of Search ..................... 455/444, 436, 455/41.2, 502, 522, 437; 370/331, 332, 336, 338

(56) References Cited

U.S. PATENT DOCUMENTS

| | | | |
|---|---|---|---|
| 5,940,743 A | * 8/1999 | Sunay et al. | 455/69 |
| 5,960,335 A | * 9/1999 | Umemoto et al. | 455/226.2 |
| 5,987,062 A | * 11/1999 | Engwer et al. | 375/225 |
| 6,018,661 A | * 1/2000 | Raith et al. | 455/437 |
| 6,026,297 A | * 2/2000 | Haartsen | 455/426.1 |
| 6,112,088 A | * 8/2000 | Haartsen | 455/437 |
| 6,167,279 A | * 12/2000 | Chang et al. | 455/462 |
| 6,278,881 B1 | * 8/2001 | Balck | 455/444 |
| 6,370,380 B1 | * 4/2002 | Norefors et al. | 455/436 |
| 6,377,805 B1 | * 4/2002 | Anvekar et al. | 455/436 |
| 6,430,395 B2 | * 8/2002 | Arazi et al. | 455/41.2 |
| 6,434,365 B1 | * 8/2002 | Knutson et al. | 455/69 |
| 6,570,857 B1 | * 5/2003 | Haartsen et al. | 370/312 |
| 6,571,103 B1 | * 5/2003 | Novakov | 455/464 |
| 6,580,700 B1 | * 6/2003 | Pinard et al. | 370/332 |
| 6,587,680 B1 | * 7/2003 | Ala-Laurila et al. | 455/411 |

FOREIGN PATENT DOCUMENTS

WO    WO 01/78246 A1    10/2001

OTHER PUBLICATIONS

Garg et al. ("MAC scheduling policies for power optimization in Bluetooth: A master driven TDD wireless system"; Garg S.; Kalia, M.; Shorey, R.; Vehicular Technology Conference Proceedings, 2000. VTC 2000-Spring Tokyo. 2000 IEEE 51st.*

Garg, Sumit. et al.; "MAC Scheduling Policies for Power Optimization in Bluetooth: A Master Driven TDD Wireless System"; VTC2000-Spring; 2000 IEEE51st; Vehicular Technology Conference Proceedings, Tokyo Japan, May 15–18, 2000; IEEE Vehicular Technology Conference, New York, New York; IEEE, US, vol. 1 of 3; conf. 51, May 15, 2000; XP000970607; pp. 196–200.

Albrecht, Markus, et al,; "IP Services Over Bluetooth: Leading the Way to a New Mobility"; Local Computer Networks, 1999; Conference on Lowell, MA, USA Oct. 18–20, 1999, Los Alamitos, California, USA, IEEE Comput. Soc. US.; Oct. 18, 1999; XP010358529; pp. 2–11.

* cited by examiner

*Primary Examiner*—William Trost
*Assistant Examiner*—Sharad Ramfuris

(57) ABSTRACT

A method, and associated apparatus, facilitates handover of communications with a mobile Bluetooth device operable to communicate packet data with other Bluetooth devices. Handover of communications is effectuated between fixed-infrastructure access points or other mobile Bluetooth devices formed in a scatternet. The device to which communications are to be handed-over becomes a slave to the Bluetooth device with which communications are ongoing, thereby to permit time synchronization thereto.

16 Claims, 5 Drawing Sheets

METHOD, AND ASSOCIATED APPARATUS, FOR EFFECTUATING HANDOVER OF COMMUNICATIONS IN A BLUETOOTH, OR OTHER, RADIO COMMUNICATION SYSTEM

The present invention relates generally to a manner by which to handover communication with a mobile Bluetooth-compatible (BT), or other communication, device from an active communication device to a target communication device. More particularly, the present invention relates to a method, and an associated apparatus, for facilitating handover of communications of the mobile Bluetooth, or other, device from an active piconet to a target piconet. Handover of communications is possible in a Bluetooth scatternet which lacks a fixed infrastructure as well as a Bluetooth system having access points forming a fixed infrastructure, or a combination thereof.

BACKGROUND OF THE INVENTION

The use of multi-user radio communication systems has achieved wide popularity in recent years as advancements in communication technologies have permitted the affordable utilization of such communication systems by large numbers of users to communicate therethrough.

Like other types of communication systems, a radio communication system is formed, at a minimum, of a sending station and a receiving station interconnected by way of a communication channel. In a radio communication system, the communication channel is formed of a radio communication channel. A radio communication channel is defined upon a portion of the electromagnetic spectrum. A communication channel defined in a wireline communication system, in contrast, is defined upon a wireline connection extending between the sending and receiving stations. Because a radio communication channel defined upon a portion of the electromagnetic spectrum is used to communicate communication signals between the sending and receiving stations, the need for wireline connection between the sending and receiving stations of a conventional wireline communication system is obviated. The use of a radio communication system to communicate therethrough, as a result, inherently increases the mobility of communication relative to communications in a conventional wireline communication system.

Digital communication techniques have been implemented in radio, as well as other, communication systems. Digital communication techniques generally permit the communication system in which the techniques are implemented to achieve greater communication capacity contrasted to conventional, analog communication techniques.

In a communication system which utilizes digital communication techniques, information which is to be communicated is digitized to form digital bits. The digital bits are typically formatted according to a formatting scheme. Groups of the digital bits, for instance, are positioned to form a packet of data.

Because packets of data can be communicated at discrete intervals, rather than continuously, a frequency band need not be dedicated solely for the communication of data between one communication pair. Instead, the frequency band can be shared amongst a plurality of different communication pairs. The ability to share the frequency band amongst the more than one communication pair permits a multiple increase in the communication capacity of the system.

Packet-data communications are effectuated, for instance, in conventional LAN (Local Area Networks). Wireless networks, operable in manners analogous to wired LANs, referred to as WLANs (Wireless Local Area Networks) have also been developed and are utilized to communicate data over a radio link. Some of such systems are able to provide for voice, as well as non-voice, communications.

A communication standard, referred to as Bluetooth, has been promulgated which provides a standard operating protocol by which to communicate data over a relatively short distance, e.g., about ten meters. The Bluetooth communication standard provides a manner which enables seamless voice and data communication by way of short-range radio links and permits a broad range of devices to be connected easily and quickly by way of the radio links. Proposals have been set forth to provide a wide array of devices with Bluetooth communication capabilities. Mobile computers and mobile phones are exemplary of devices which have been proposed to make use of the Bluetooth communication standard.

An advantageous characteristic of the Bluetooth communication standard is the ability to provide combined usability models based upon functions provided by different devices. For instance, using Bluetooth-based communication signals, a communication path can be formed between a PDU (Personal Data Unit) and a cellular phone. And, a second communication path is also formable between a cellular phone and a cellular base station, thereby providing connectivity for both data and voice communication. In this exemplary implementation, the PDU maintains its function as a computing device and the cellular phone maintains its function as a communication device, while each of the devices provides a specific function efficiently by way of the Bluetooth communication scheme.

Multi-point connections are also provided through the use of a Bluetooth-based communication scheme. While the radio range envisioned pursuant to the Bluetooth communication standard is relatively small, i.e., on the order of ten meters, Bluetooth-based devices can, appropriately positioned, act as bridges to extend the range of the communication of the Bluetooth-based communication signals.

A WIO (Wireless Intranet Office) is also exemplary of a communication system in which Bluetooth-compatible devices can be utilized. In a WIO, typically, voice, and other real-time, communications are provided through the use of a mobile station. Voice communication by way of a WIO provides the advantages of use of a wireless communication system in a cost-effective manner. Voice, as well as other data, can be communicated between mobile stations operable in such a system.

The Bluetooth communication standard defines a piconet, formed of two or more Bluetooth-compatible devices which share a common communication channel. In a WIO or WLAN, the piconet architecture defined in the Bluetooth communication standard is integrated into the WLAN through the introduction of an access point (AP). An access point defines a logical point at which data unit of the wired portion of the LAN enters the piconet defined in the Bluetooth communication standard.

By positioning a plurality of access points at a plurality of spaced-apart locations, a mobile station exiting a communication range encompassed by a first access point enters the communication range encompassed by a second access point.

Analogous to operation of a mobile station in a conventional, cellular communication system in which communication handovers are effectuated to permit continued communication by the mobile station as the mobile station moves throughout a geographical area, a mobile station operable in the LAN similarly would be permitted continued communication if handover of communications between access points would be possible.

While currently, the Bluetooth communication standard does not define a handover method, a manner by which to handover communications of a mobile station from one piconet to another would advantageously facilitate communications in a Bluetooth-compatible communication system.

It is in light of this background information related to wireless communication systems that the significant improvements of the present invention have evolved.

SUMMARY OF THE INVENTION

The present invention, accordingly, advantageously provides a method, and associated apparatus, by which to handover communications with a mobile communication device, such as a mobile Bluetooth-compatible device, or other communication device, from an active communication device to a target communication device.

Through operation of an embodiment of the present invention, handover of communication is possible between Bluetooth scatternets, or other networks which lack fixed infrastructures. Handover of communications is also possible in a Bluetooth, or other, system having access points forming a fixed infrastructure, as well as also in a system having both scatternets and a fixed infrastructure.

In one aspect of the present invention, apparatus, and an associated method, is provided by which to handover communications with a mobile Bluetooth from one piconet to another in a manner both to permit continued communication as well as to limit packet loss during the handover.

When handover is to be effectuated between successive access points of a Bluetooth-compatible WLAN, the mobile Bluetooth device forming the mobile station is initially a slave to the access point with which the mobile Bluetooth device communicates. When the mobile Bluetooth device travels into an area encompassed by another access point, a handover of communications from the first access point to the subsequent access point is generally desired. Measurements are performed during operation of the mobile Bluetooth device. For example, measurements are made to determine when a handover should be initiated. In one implementation, power levels, or other of the signals detected at the Bluetooth device communication quality indicia, are measured at selected intervals.

When the power levels of signals generated by the first access point falls beneath a certain threshold, the Bluetooth mobile device sends an inquiry message to the second access point, forming now a target access point. The inquiry message inquires of a device address associated with the target access point. When the target access point receives the inquiry, a response is generated, and returned to the mobile Bluetooth device, with the appropriate address and clock information of the target access point. Thereafter, the target access point pushes other Bluetooth devices in the piconet in which the target access point also forms a portion, into reduced-power states, such as SNIFF or HOLD states. If the availability of temporary addresses by which to identify the mobile Bluetooth device is limited, one or more of the other Bluetooth devices associated with the second piconet can be put into a PARK mode by the target access point. When pushed into a PARK mode, the temporary address identifying such Bluetooth device is made available to identify other Bluetooth devices, such as the mobile Bluetooth device of which handover of communications is desired.

In another aspect of the present invention, the master-slave roles of the target access point and the mobile Bluetooth device are exchanged. That is to say, with respect to each other, the mobile Bluetooth device becomes a master and the target access point becomes a slave thereto. The mobile Bluetooth device, prior to the handover, remains as a slave to the access point associated with the first piconet. Time synchronization of the target access point to the mobile Bluetooth device is then effectuated. Because of the time synchronization, the handover of communications from the first piconet to the second piconet can be effectuated without loss of packets of data during the handover due to non-synchronization of timing between the piconets.

In another aspect of the present invention, when selection is made is initiate a handover, the active access point is caused to push all active Bluetooth devices, other than the mobile Bluetooth device and the active access point, into reduced power-level states. Then, the mobile Bluetooth device and the active access point exchange master-slave roles. That is to say, the mobile Bluetooth device becomes a master to the active access point, and the active access point becomes a slave thereto. Thereafter, handover is effectuated of the mobile Bluetooth device from the first piconet to the second piconet and the connection of the mobile Bluetooth device to the first piconet is terminated.

In another aspect of the present invention, handover of communications is effectuated between piconets of a scatternet. Handover of communications is effectuated with a handover of communication from a first piconet to a second piconet. The mobile Bluetooth device and a master device of the second piconet exchange master-slave relationships with respect to each other. Once the mobile Bluetooth device becomes a master with respect to the device which becomes its slave, the mobile Bluetooth device causes such other device to become time synchronized thereto. Thereafter, handover of communications to the second piconet is effectuated.

Because a manner is provided by which to facilitate handover of communications between piconets of a Bluetooth communication system, the convenience of use of the Bluetooth communication system is facilitated.

In these and other aspects, therefore, a method, and associated apparatus, is provided for handing over communications of a mobile communication device initially operable in a connected state in a first piconet to a second piconet, thereafter to be operable in a connected state in the second piconet. The first piconet includes at least one first-piconet communication device and the second piconet includes at least one second-piconet communication device. The initiation of handover of communications from the first piconet to the second piconet is selected responsive to communication indicia representative of communications with the mobile communication device. The at least one second-piconet communication device is caused to be come time-synchronized with the mobile communication device. Thereafter, communications with the mobile communication device by way of the second piconet is effectuated. Thereby, the mobile communication device is operated in the connected state in the second piconet.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
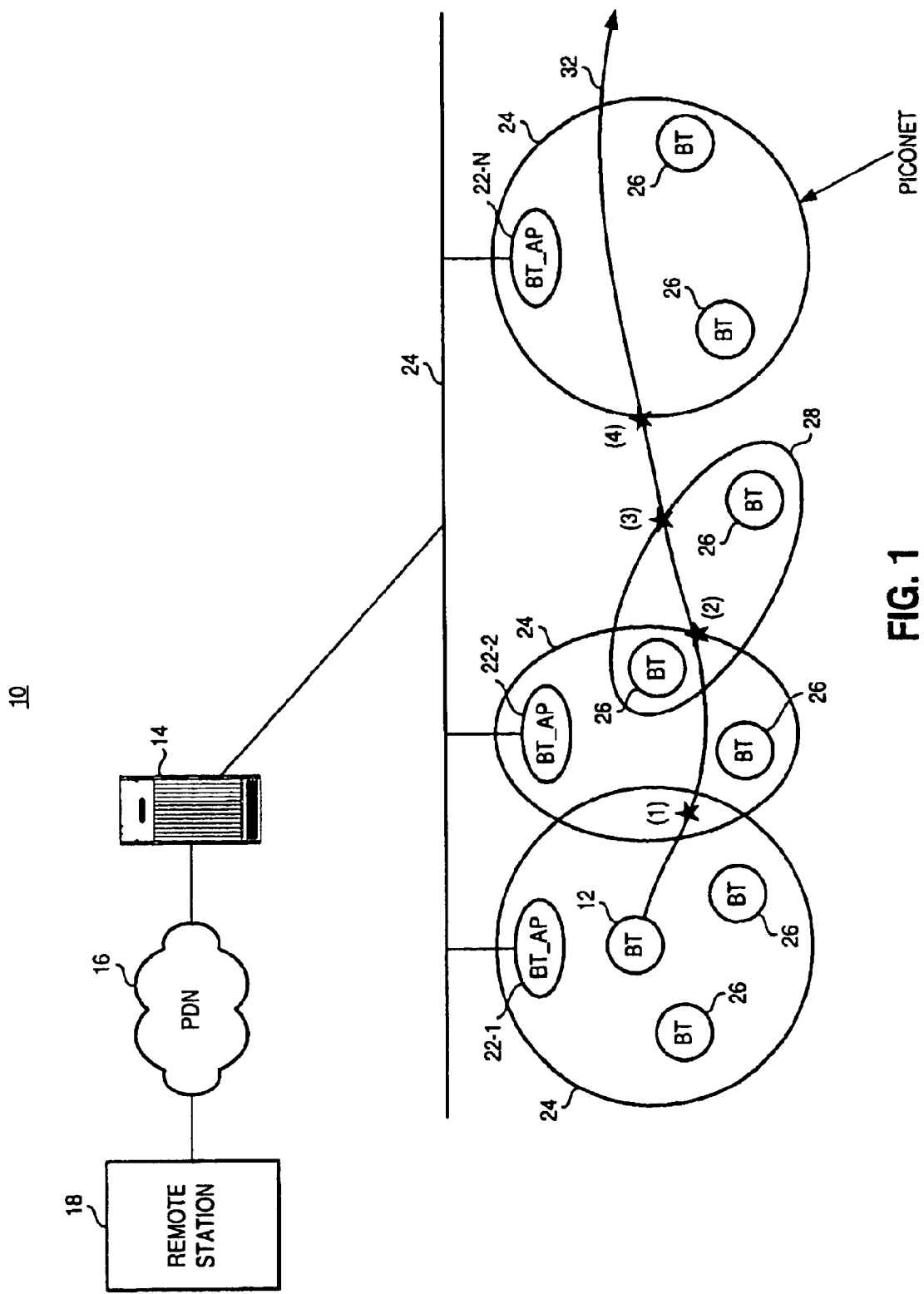
FIG. 1 illustrates a functional diagram of a Bluetooth communication system forming a WLAN (Wireless Local Area Network) in which an embodiment of the present invention is operable.

Referring first to FIG. 1, a communication system, shown generally at 10, provides for communication of data with a mobile Bluetooth device 12 operable in a Bluetooth-compatible WLAN (Wireless Local Area Network), or the like. The fixed infrastructure of the WLAN is coupled, by way of a gateway 14 to a packet data network 16, such as the Internet. A remote station 18 is also coupled to the packet data network. A communication path formed upon a radio link formed between the mobile Bluetooth device 12 and the network infrastructure of the WLAN, and through the WLAN, the gateway 14, and the packet data network 16 permits communications to be effectuated, for instance, between the mobile Bluetooth device 12 and the remote station 18.

The network infrastructure of the WLAN is here shown to include a plurality of access points 22-1 through 22-N, each of which is connected by way of a line 24. Each of the access points 22 defines a coverage area 24, herein referred to as a cell. Coverage areas of adjacent ones of the access points 22 partially overlap.

The WLAN forms a multi-user system permitting a plurality of users, here Bluetooth devices, to communicate by way of the WLAN. In the exemplary illustration of the figure, the first cell 24 also includes an additional two Bluetooth devices 26, the second the cell 24 also includes two additional two Bluetooth devices 26, and the Nth cell 24 also includes two Bluetooth devices 26. The Bluetooth devices of each of the cells 24 defines a piconet, operable pursuant to the Bluetooth communication standard.

A piconet need not include a network infrastructure device, such as an access point 22. A piconet, here referenced by 28, is formed, of any two or more Bluetooth devices including a master Bluetooth device and up to seven slave Bluetooth devices. Piconets are dynamically configurable, and reconfigurable, again all pursuant to the Bluetooth communication standard. As set forth in the standard, a Bluetooth device can, concurrently, form a portion of more than one piconet. And, the device may form a master Bluetooth device of one piconet and a slave Bluetooth device of another piconet. Advantage is taken of this capability of a Bluetooth device during operation of an embodiment of the present invention.

A mobile Bluetooth device is permitted movement throughout an area, here at the least the area encompassed by the WLAN forming a portion of the communication system. Here, the Bluetooth device 12 travels along the path 32, and, during such travel, the Bluetooth device travels through a plurality of cells-piconets 24–28. As the Bluetooth device 12 travels, handover of communications from one piconet to another is effectuated pursuant to operation of an embodiment of the present invention.

Figure 2:
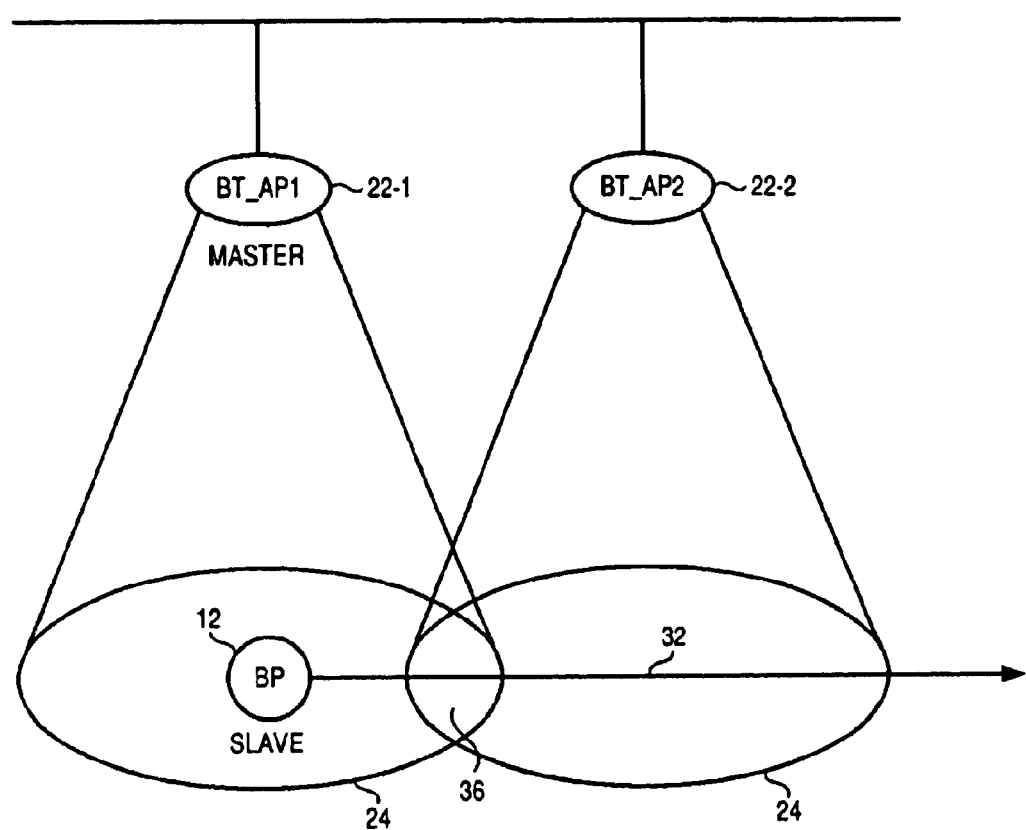
FIG. 2 illustrates a portion of the communication system shown in FIG. 1, here representing initial positioning of a mobile Bluetooth device during a communication session.

FIG. 2 illustrates two of the access points, access points 22-1 and 22-2 and the respective cells 24 defined by the coverage areas of the access points. Overlapping portion 36 of the two cells 24 are shown in the figure. The mobile Bluetooth device 12 travels along a path indicated by the arrow 32. As shown, the path along which the device 12 travels causes the mobile Bluetooth device to travel through the area 36 and into the cell 24 defined by the second access point 22-2. When initially-positioned, as shown, the mobile Bluetooth device is initially in a connected state with the first access point 22-1. Conventionally, the access point 22-1 forms a master and the mobile Bluetooth device forms a slave thereto. When the mobile Bluetooth device is in a connected stated with the access point 22-1, the mobile Bluetooth device is maintained in time synchronization with the access point.

Figure 3:
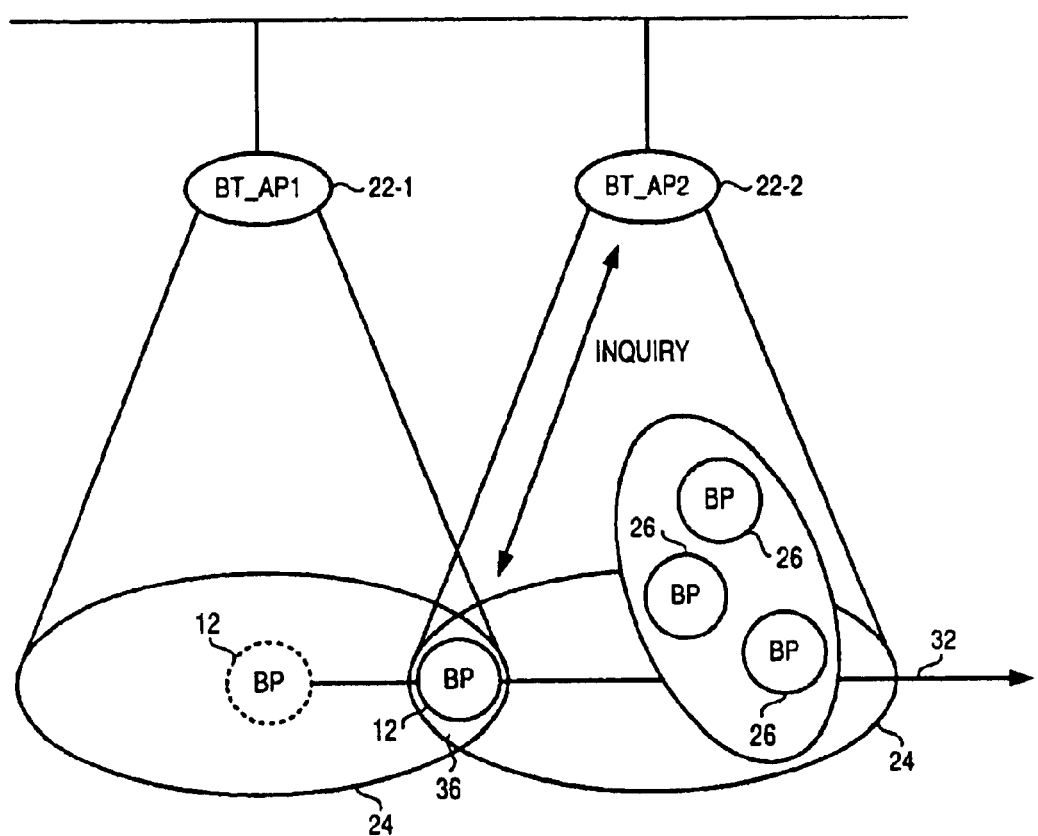
FIG. 3 also illustrates a portion of the communication system shown in FIG. 1, here representing positioning of the mobile Bluetooth device when the device is repositioned at a location at which a handover of communications is desired.

FIG. 3 illustrates subsequent positioning of the mobile Bluetooth device 12 at the area 36 formed of the overlapping coverage areas of the first and second access points 22-1 and 22-2. The mobile Bluetooth device is operable to determine that a handover of communications is desired, such as by way of measuring power levels, or other communication indicia, of signals transmitted by the access points 22-1 and 22-2. When the power level, or other communication indicia, is greater than a selected threshold, selection of handover is initiated. In addition, the mobile Bluetooth device can enter the inquiry state whenever it likes. For instance, if the signal magnitude of signals generated by the access point 22-1 is weak, i.e., beneath a threshold, the mobile Bluetooth device searches for other possibilities including a new AP, piconet, etc. Establishment of a new connection with the access point 22-2 is attempted by the mobile Bluetooth device pursuant to an INQUIRY process. An INQUIRY message is sent by the mobile Bluetooth device to the access point 22-2 to inquire of a device address identifying the access point. When the access point detects the INQUIRY message, an INQUIRY response message is generated and returned to the mobile Bluetooth device. The INQUIRY response message includes the address and clock information associated with the second access point.

Time synchronization is generally not maintained between piconets, including the piconets that include respective ones of the access points 22. As a result, although the mobile Bluetooth device 12 is time-synchronized to the access point 22-1 of the first piconet, the mobile Bluetooth device is not time-synchronized to the piconet of which the access point 22-2 forms a portion. To be recognized as a Bluetooth unit associated with the second access point 22-2, the Bluetooth device should be synchronized together with the access point 22-2. When time-synchronized to the piconet of which the access point 22-2 forms a portion, it is necessary to have a time synchronization because of the frequency hopping system. The frequency hopping sequence is generated from the address and clock timing. To be recognized as a Bluetooth unit, an internal clock of the mobile Bluetooth device corresponds with the clock of the access point 22-2.

During operation of an embodiment of the present invention, when handover of communications is selected to be initiated, the access points 22-2, forming the master Bluetooth device relative to other Bluetooth devices 26 in the piconet, causes such other Bluetooth devices 26 to enter a reduced power-level state. Such Bluetooth devices are caused, for instance, to enter the SNIFF or HOLD modes, both defined in the Bluetooth communication standard. As each Bluetooth device is identified by a MAC address, also described as an active member address (AM_ADDR), if the availability of MAC addresses is limited, some of the Bluetooth devices 26 are selectably alternately caused to enter a PARK mode, as also defined in the Bluetooth communication standard. When a Bluetooth device is caused to enter the PARK mode, the device releases the MAC address (i.e., AM_ADDR) by which the device is identified. When the MAC address (i.e., AM_ADDR) is released, the address can be reused to identify another Bluetooth device. In a system in which tiers of service, analogous to QoS (Quality of Service) are defined, Bluetooth devices to which lower-tier services are provided are first pushed into the PARK mode while Bluetooth devices to which higher-tiers of service are provided are more likely to be prevented from entering the PARK mode.

Currently, the mobile Bluetooth unit 12 is a master of the access point 22-2 and the access point 22-2 is a slave of the mobile Bluetooth unit 12. Once the other Bluetooth devices 26 have been caused to enter a reduced power-level mode, the master-slave roles of the mobile Bluetooth device 12 and the access point 22-2 are exchanged. That is to say, with respect to one another, the mobile Bluetooth device 12 becomes a slave to the access point 22-2. And, at the same time, the Bluetooth device 12 remains a slave to the first access point 22-1 and remains time-synchronized with the access point 22-1. But, the mobile Bluetooth device 12 becomes a slave of the access point 22-2, and the time synchronization of the second piconet so defined is effectuated with respect to a second clock. Once this connection between the mobile Bluetooth device 12 (a slave) and the access point 22-2 is completed, the mobile Bluetooth device 12 is disconnected out of a communication link for the first access point 22-1 of the first piconet.

While the just-described, exemplary implementation describes operation in which the mobile Bluetooth device requests the exchange of master-slave roles with the access point 22-2, in another implementation, the access point 22-2 controls all the Bluetooth devices within its cell 24, and the access point 22-2 is aware of an appropriate timing scheme which shall accept the mobile Bluetooth device 12.

Figure 4:
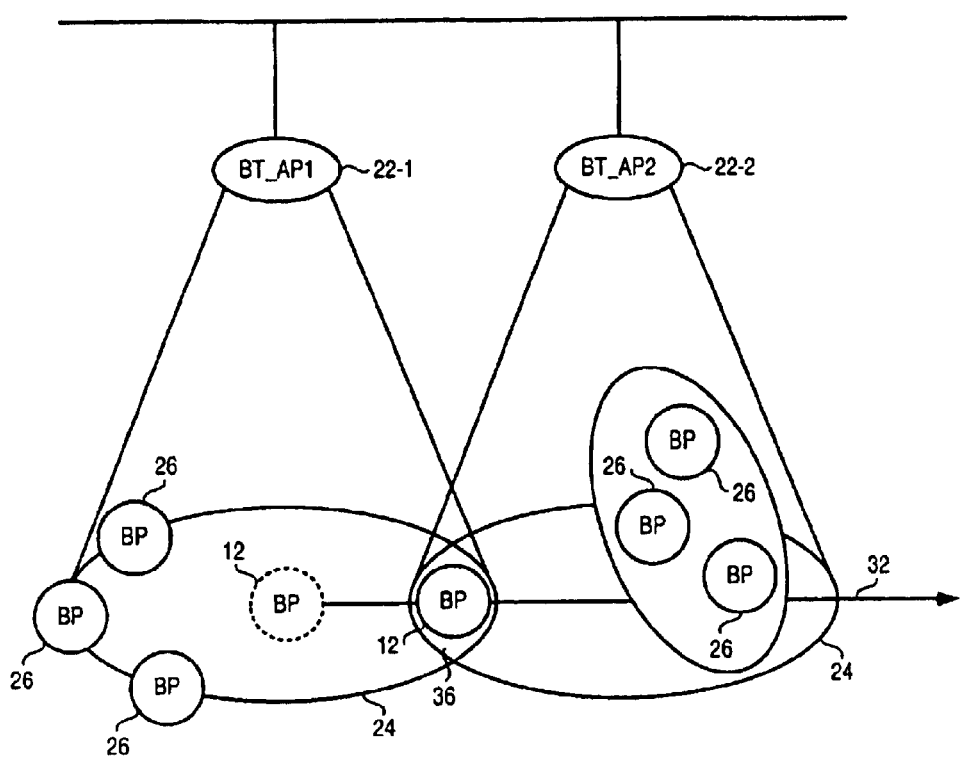
FIG. 4 also illustrates a portion of the communication system shown in FIG. 1, here also representing positioning of the mobile Bluetooth device at a position at which handover is desired and in which additional Bluetooth devices are located at the piconet to which the communications are to be handed over during operation of an embodiment of the present invention.

FIG. 4 again illustrates positioning of the mobile Bluetooth device 12 at the area 36, here also subsequent to selection of initiation of handover of communications from the first access point 22-1 to the second access point 22-2. FIG. 4 represents alternate operation of an embodiment of the present invention. Here, the mobile Bluetooth device maintains its connection with the first access point 22-1 after a connection with the second access point 22-2. By maintaining connections with both of the access points, the possibility of loss of packets of data is reduced. Here, the other Bluetooth devices 26 located in the coverage area encompassed by the access point 22-1 are pushed into reduced power-level modes. That is to say, the other Bluetooth devices are pushed into a SNIFF, a HOLD, or PARK mode, again, according to a tier-of-service pursuant to which such Bluetooth devices are operable. Then, the mobile Bluetooth device 12 and the first access point 22-1 exchange master-slave roles such that the Bluetooth device 12 becomes the master of the access point 22-1 and the access point becomes a slave thereto. The access point 22-1 remains a master to the other Bluetooth devices 26. Subsequent to completion of handover of communications, the Bluetooth device 12 terminates the connection with the access point 22-1.

Figure 5:
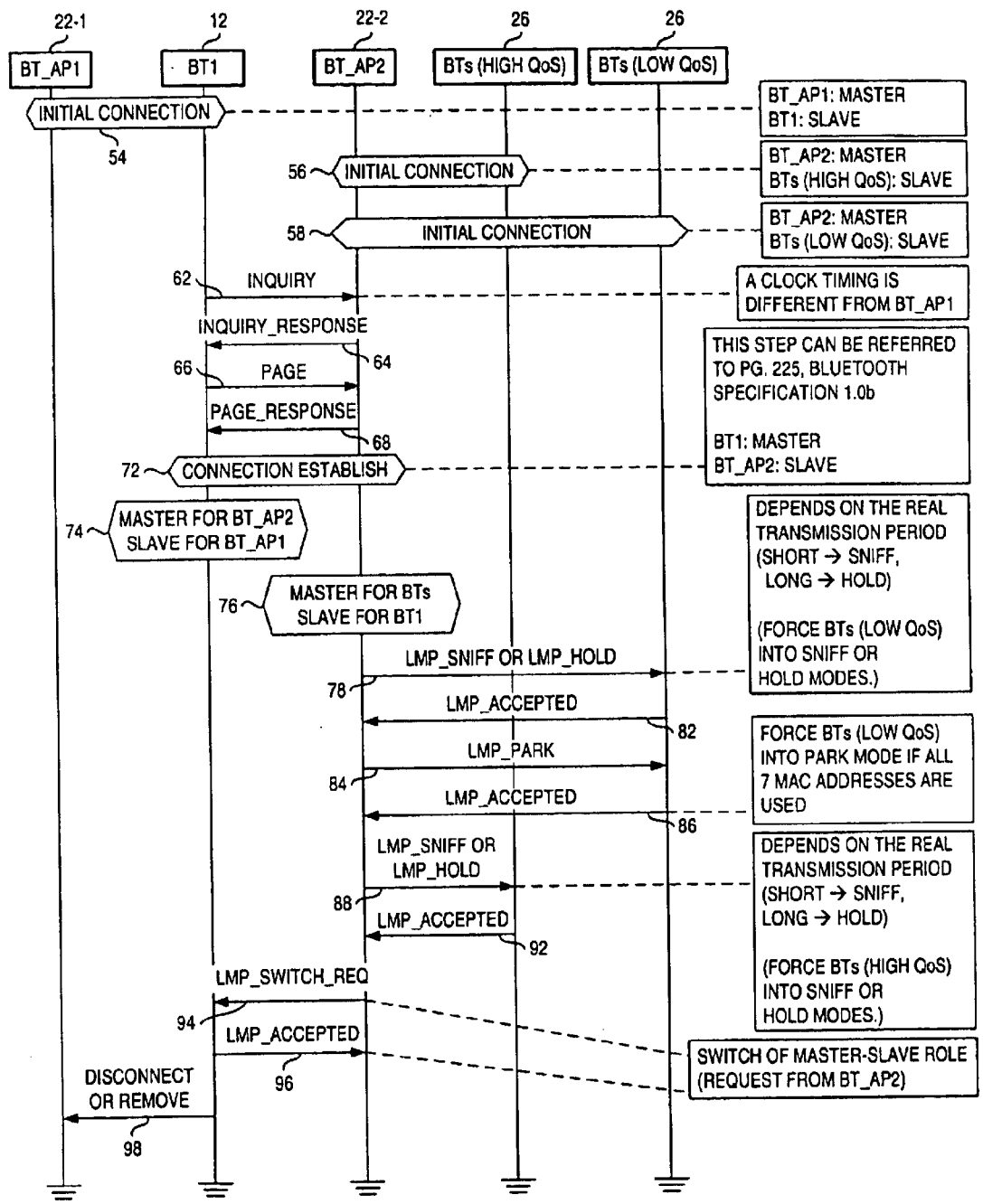
FIG. 5 illustrates a message sequence diagram representing messaging generated during operation of an embodiment of the present invention.

The message sequence diagram, shown generally at 52, of FIG. 5, illustrates messaging generated during operation of an embodiment of the present invention by which communications with the mobile Bluetooth device 12 are handed over from a first access point 22-1 to a second access point 222. It is again noted that, while operation of the exemplary embodiment of the present invention is described with respect to a communication system having a fixed infrastructure, operation is analogously implementable and describable with respect to an infrastructure-free Bluetooth scatternet, or the like.

As noted previously with respect to the preceding figures, the mobile Bluetooth device is initially in a connection with the first access point 22-1. The initial connection between a Bluetooth device 12 and the first access point is indicated by the segment 54 in the figure. The second access point 22-2 is also initially in a communication connection with other Bluetooth devices 26 and with which a piconet is formed. Here, the other Bluetooth devices are divided into a first set of Bluetooth devices operable pursuant to a high tier, i.e., a high QoS level, of service and Bluetooth devices operable pursuant to a low tier of service. The connections between the second access point and the Bluetooth devices of the two groups are indicated by the segments 56 and 58 in the figure.

When, and as illustrated previously with respect to FIGS. 3 and 4, the mobile Bluetooth device 12 is positioned at the area 36 (shown in FIGS. 2–4) at which selection is made to initiate handover of communications from the first access point to the second access point, an INQUIRY message is generated by the mobile Bluetooth device and transmitted to the second Bluetooth device. The inquiry message is indicated in the figure by the segment 62. The access point provides an INQUIRY response, indicated by the segment 64, which is returned to the mobile Bluetooth device. Responsive thereto, and as indicated by the segment 66, a PAGE message is then transmitted by the mobile Bluetooth device to the second access point 22-2. And, as indicated by the line segment 68, a PAGE response message is returned by the second access point to the mobile Bluetooth device.

Then, and as indicated by the segment 72, a connection is established between the Bluetooth device 12 and the second access point. Details of the establishment of a connection between two Bluetooth devices is described in detail in the Bluetooth communication standard, such as the Bluetooth specification 1.0b. In the connection, the mobile Bluetooth device forms a master device and the second access point forms a slave thereto. Blocks 74 and 76 indicate that the mobile Bluetooth device 12 forms a master for its connection with the second access point and a slave to the first access point 22-1 while the second access point remains a master for the other Bluetooth devices 26 while becoming a slave to the mobile Bluetooth device 12.

Thereafter, LMP messages LMP_SNIFF or LMP_HOLD are sent to the second group of Bluetooth devices 26. Sending of such messages are indicated by the line segment 78 in the figure. LMP_ACCEPTED messages 82 are returned by such Bluetooth devices. Transmission of a LMP_PARK message, indicated by the segment 84, is also shown in the figure. Such message instructs one or more of the other Bluetooth devices into a PARK mode if MAC addresses (i.e., AM_ADDR) are unavailable to be reassigned to, for instance, the mobile communication device. When a Bluetooth device enters a PARK mode, the MAC address used to identify the device is released, thereby to become available for use by another Bluetooth device. A LMP_ACCEPTED message responsive thereto is indicated by the segment 86.

The sequence diagram also illustrates transmission of analogous LMP_SNIFF and LMP_HOLD messages, indicated by the segment 88 transmitted to the first group of other Bluetooth devices 26. The first group of Bluetooth devices are operated pursuant to other tiers of service, and LMP_ACCEPTED messages generated responsive thereto are indicated by the line segment 92.

The sequence diagram further illustrates a switch request, LMP_SWITCH_REQ message 94 sent by the mobile Bluetooth device 12 to the second access point 22-2 and this message can also be initiated by the access point 22-2 to the mobile Bluetooth device 12 and, responsive thereto, an accept message LMP_ACCEPTED, indicated by the segment 96. Finally, subsequent to handover, a disconnect, or remove message is sent by the mobile Bluetooth device to the first access point 22-1, here indicated by the line segment 98.

Thereby, through operation of an embodiment of the present invention, handover of communications from one Bluetooth device to another Bluetooth device is effectuated to permit continued communications with a mobile Bluetooth device. The Bluetooth devices from which, and to which, communications are handed-over form fixed infrastructure devices or mobile devices, or any combination thereof.

The preferred descriptions are of preferred examples for implementing the invention, and the scope of the invention should not necessarily be limited by this description. The scope of the present invention is defined by the following claims.

We claim:

1. A method for handing over communications with a mobile communication device (MCD), the MCD initially operable to communicate with a communication network infrastructure via a first piconet prior to handover and with a second piconet after handover, wherein the first piconet comprises a first network access point and the second piconet comprises a second network access point and at least one second-piconet pre-handover slave device, said method comprising:

selecting initiation of handover of communication between the MCD and the network infrastructure via the first piconet to the second piconet responsive to a communication indicia representative of communications with the MCD;

placing the at least one second-piconet pre-handover slave device in a reduced power-level state subsequent to selecting initiation of handover;

causing at least one second-piconet communication device to become time-synchronized with the MCD; and effectuating communications between the MCD and the network infrastructure by way of the second piconet.

2. The method of claim 1 wherein the second network access point is operating as the second piconet master, and wherein said operation of causing the at least one second-piconet communication device to become time-synchronized comprises the operations of:

making the second network access point a slave to the MCD;

time-synchronizing the slave formed of the second network access point to the MCD.

3. The method of claim 2 wherein said method of causing the at least one second-piconet communication device to become time-synchronized further comprises the operations of:

making the second-piconet pre-handover slave communication device a slave to the MCD; and time-synchronizing the slave formed of the second-piconet pre-handover slave communication device to the MCD.

4. The method of claim 1 further comprising the operation of ceasing communication between the MCD and the network infrastructure via the first piconet subsequent to effectuating communications by way of the second piconet.

5. The method of claim 1 wherein the communication indicia responsive to which initiation of handover of communications is selected during said operation of selecting comprises signal power levels of signals detected by the MCD when operated in the first piconet.

6. The method of claim 1 wherein the first-piconet comprises at least one first-piconet pre-handover slave device, and further comprising the operation of placing the at least one first-piconet, pre-handover slave device in a reduced power-level state.

7. The method of claim 6 further comprising the additional operation, prior to said operation of causing the at least one second-piconet communication device to become time-synchronized of:

making the first-piconet pre-handover master communication device a slave to the MCD.

8. The method of claim 7 wherein the second second network access point defines a target cell, and wherein said operation of selecting initiation of handover occurs when the MCD enters the target cell.

9. The method of claim 1 wherein the first network access point, the second network access point, and the MCD each comprise a Bluetooth-compatible (BT) device, and wherein said operation of selecting initiation of handover comprises selecting initiation of handover of communications from a first BT piconet to a second BT piconet.

10. The method of claim 9 wherein the second piconet comprises a second-piconet pre-handover slave BT device and wherein, prior to said operation of causing, said method comprises the additional operation of:

placing the second-piconet pre-handover BT slave device in a reduced power-level state.

11. The method of claim 10 wherein the reduced power-level state into which the pre-handover BT slave device is placed comprises a HOLD mode.

12. The method of claim 10 wherein the reduced power-level state into which the pre-handover BT slave device is placed comprises a SNIFF mode.

13. The method of claim 10 wherein the reduced power-level state into which the pre-handover BT slave device is placed comprises a PARK mode.

14. The method of claim 9 wherein each BT device is identified by a temporary identifier selected from a set of temporary identifiers and wherein the reduced power-level state into which the pre-handover BT slave device is placed is a state in which the pre-handover BT slave device is stripped of the temporary identifier.

15. Apparatus for facilitating handing over communications of a mobile communication device (MCD), initially operable to communicate with a communication network infrastructure by way of a first piconet, to communicating with the network infrastructure by way of a second piconet, the first piconet including a first network access point and the second piconet including a second network access point and at least one second-piconet pre-handover slave device, said apparatus comprising:

a handover initiation selector coupled to receive indications of a communication indicia representative of communications with the MCD, said handover initiation selector for selecting initiation of handover of communications from the first piconet to the second piconet responsive to the indications of the communication indicia; and a time-synchronizer coupled to receive indications of selection by said handover initiation selector of selection of the initiation of handover, said time synchronizer for causing the second network access point to become time-synchronized with the MCD, wherein the time-synchronizer is further for placing the at least one second-piconet pre-handover slave device in a reduced power-level state.

16. The apparatus of claim 15 wherein said time synchronizer makes the second network access point a slave to the MCD and time-synchronizes the slave formed of the pre-handover master device to the MCD.

* * * * *